(12) United States Patent
Kalyanpur et al.

(10) Patent No.: US 8,532,092 B2
(45) Date of Patent: Sep. 10, 2013

(54) METHODS, SYSTEMS, AND COMPUTER READABLE MEDIA FOR PROVIDING NEXT GENERATION NETWORK (NGN)-BASED END USER SERVICES TO LEGACY SUBSCRIBERS IN A COMMUNICATIONS NETWORK

(75) Inventors: Gaurang Kalyanpur, Allen, TX (US); Amrit P. S. Wadhwa, Cary, NC (US)

(73) Assignee: Tekelec, Inc., Morrisville, NC (US)

( * ) Notice: Subject to any disclaimer, the term of this patent is extended or adjusted under 35 U.S.C. 154(b) by 897 days.

(21) Appl. No.: 12/477,120

(22) Filed: Jun. 2, 2009

(65) Prior Publication Data
US 2009/0296694 A1   Dec. 3, 2009

Related U.S. Application Data

(60) Provisional application No. 61/058,045, filed on Jun. 2, 2008.

(51) Int. Cl.
*H04L 12/66* (2006.01)

(52) U.S. Cl.
USPC .......................................... 370/352

(58) Field of Classification Search
USPC ................................. 370/352–360
See application file for complete search history.

(56) References Cited

U.S. PATENT DOCUMENTS

| | | |
|---|---|---|
| 5,671,225 A | 9/1997 | Hooper et al. |
| 5,838,683 A | 11/1998 | Corley et al. |
| 6,134,618 A | 10/2000 | Hebert |
| 6,182,086 B1 | 1/2001 | Lomet et al. |
| 6,359,979 B1 | 3/2002 | Wang et al. |

(Continued)

FOREIGN PATENT DOCUMENTS

| | | |
|---|---|---|
| EP | 0 865 218 A2 | 9/1998 |
| KR | 1020030025024 A | 3/2003 |

(Continued)

OTHER PUBLICATIONS

Official Action for U.S. Appl. No. 11/731,772 (Jul. 14, 2009).

(Continued)

*Primary Examiner* — Asad Nawaz
*Assistant Examiner* — Syed S Ali
(74) *Attorney, Agent, or Firm* — Jenkins, Wilson, Taylor & Hunt, P.A.

(57) ABSTRACT

The subject matter described herein includes methods, systems, and computer readable media for providing NGN-based end user services to legacy subscribers in a communications network. According to one aspect, the subject matter described herein includes a method for providing NGN-based end user services to legacy subscribers in a communications network that includes, at a service creation system (SCS) node having at least one processor, using the at least one processor for receiving a SS7 call setup message associated with a call involving a legacy subscriber access device and holding the SS7 call setup message. The method also includes, while holding the SS7 call setup message, generating a SIP call setup message related to the SS7 call setup message, and initiating the providing of at least one NGN-based end user service for the call using the SIP call setup message. The method further includes determining whether to modify the SS7 call setup message based on the at least one NGN-based end user service, and, in response to determining to modify the SS7 call setup message, modifying the SS7 call setup message, and routing the SS7 call setup message towards a destination.

18 Claims, 13 Drawing Sheets

(56) References Cited

U.S. PATENT DOCUMENTS

| | | | |
|---|---|---|---|
| 6,434,155 B1 | 8/2002 | Jones et al. | |
| 6,606,668 B1 | 8/2003 | MeLampy et al. | |
| 6,639,981 B1 | 10/2003 | Dunn, Jr. et al. | |
| 6,647,113 B2* | 11/2003 | McCann et al. | 379/221.13 |
| 6,711,251 B1 | 3/2004 | Kieren | |
| 6,731,741 B1 | 5/2004 | Fourcand et al. | |
| 6,735,621 B1 | 5/2004 | Yoakum et al. | |
| 6,836,477 B1 | 12/2004 | West, Jr. et al. | |
| 6,865,266 B1 | 3/2005 | Pershan | |
| 6,914,973 B2* | 7/2005 | Marsico | 379/221.13 |
| 6,944,666 B2 | 9/2005 | Belkin | |
| 6,975,855 B1 | 12/2005 | Wallenius | |
| 6,978,313 B1* | 12/2005 | Pietrowicz | 709/238 |
| 6,985,568 B2* | 1/2006 | Fleischer et al. | 379/114.12 |
| 6,987,781 B1* | 1/2006 | Miller et al. | 370/496 |
| 7,007,085 B1* | 2/2006 | Malik | 709/224 |
| 7,010,113 B2 | 3/2006 | Moss et al. | 379/210.02 |
| 7,020,256 B2* | 3/2006 | Jain et al. | 379/201.02 |
| 7,027,433 B2 | 4/2006 | Tuohino et al. | |
| 7,031,747 B2 | 4/2006 | Cyr et al. | |
| 7,050,457 B2* | 5/2006 | Erfurt | 370/467 |
| 7,054,427 B2* | 5/2006 | Malik | 379/207.02 |
| 7,054,431 B2* | 5/2006 | Fleischer et al. | 379/221.08 |
| 7,079,640 B2* | 7/2006 | Mikhailov et al. | 379/230 |
| 7,085,260 B2 | 8/2006 | Karaul et al. | |
| 7,092,384 B1* | 8/2006 | Ramaswamy et al. | 370/352 |
| 7,106,849 B2* | 9/2006 | Baratz et al. | 379/221.08 |
| 7,116,974 B2* | 10/2006 | Begeja et al. | 455/417 |
| 7,127,052 B1* | 10/2006 | Baumert et al. | 379/201.02 |
| 7,136,651 B2 | 11/2006 | Kalavade | |
| 7,194,082 B2 | 3/2007 | Kieren | |
| 7,209,964 B2* | 4/2007 | Dugan et al. | 709/223 |
| 7,245,609 B2* | 7/2007 | D'Eletto | 370/352 |
| 7,286,545 B1 | 10/2007 | Tester et al. | |
| 7,372,826 B2 | 5/2008 | Dahod et al. | |
| 7,403,517 B2 | 7/2008 | Westman | |
| 7,472,352 B2* | 12/2008 | Liversidge et al. | 715/758 |
| 7,516,411 B2* | 4/2009 | Beaton et al. | 715/753 |
| 7,606,202 B2 | 10/2009 | Marathe et al. | |
| 7,779,131 B2* | 8/2010 | Nishida et al. | 709/227 |
| 7,983,245 B2* | 7/2011 | Eichler et al. | 370/352 |
| 8,054,963 B2* | 11/2011 | Kung et al. | 379/211.02 |
| 8,059,667 B2* | 11/2011 | Lean et al. | 370/401 |
| 8,073,127 B2 | 12/2011 | Bantukul et al. | |
| 8,213,440 B2 | 7/2012 | Bantukul et al. | |
| 2001/0040957 A1 | 11/2001 | McCann et al. | |
| 2002/0048360 A1 | 4/2002 | Zambre et al. | |
| 2003/0037108 A1 | 2/2003 | Peiffer et al. | |
| 2003/0050969 A1 | 3/2003 | Sant et al. | |
| 2003/0081754 A1 | 5/2003 | Esparza et al. | |
| 2004/0024894 A1 | 2/2004 | Osman et al. | |
| 2004/0082332 A1 | 4/2004 | McCann et al. | |
| 2004/0184435 A1 | 9/2004 | Westman | |
| 2004/0223604 A1 | 11/2004 | Kieren | |
| 2004/0264671 A1 | 12/2004 | Lamberton et al. | |
| 2005/0111641 A1 | 5/2005 | Koskinen et al. | |
| 2005/0281399 A1 | 12/2005 | Moisey et al. | |
| 2005/0286531 A1 | 12/2005 | Tuohino et al. | |
| 2006/0079236 A1 | 4/2006 | Del Pino et al. | |
| 2006/0104431 A1 | 5/2006 | Emery et al. | |
| 2006/0105766 A1 | 5/2006 | Azada et al. | |
| 2006/0136557 A1 | 6/2006 | Schaedler et al. | |
| 2006/0143517 A1 | 6/2006 | Douceur et al. | |
| 2006/0291488 A1 | 12/2006 | Naqvi et al. | |
| 2007/0060166 A1* | 3/2007 | Kitamura et al. | 455/450 |
| 2007/0064886 A1* | 3/2007 | Chiu et al. | 379/88.17 |
| 2007/0086582 A1 | 4/2007 | Tai et al. | |
| 2007/0100981 A1 | 5/2007 | Adamczyk et al. | |
| 2007/0121908 A1 | 5/2007 | Benedyk et al. | |
| 2007/0258575 A1 | 11/2007 | Douglas et al. | |
| 2008/0031196 A1 | 2/2008 | Marathe et al. | |
| 2008/0112393 A1 | 5/2008 | Ho et al. | |
| 2008/0160995 A1 | 7/2008 | Thiebaut et al. | |
| 2008/0198862 A1 | 8/2008 | Bantukul et al. | |
| 2008/0198996 A1 | 8/2008 | Bantukul et al. | |
| 2008/0198999 A1 | 8/2008 | Bantukul et al. | |
| 2008/0209564 A1 | 8/2008 | Gayde et al. | |
| 2008/0254833 A1 | 10/2008 | Keevill et al. | |
| 2008/0260119 A1 | 10/2008 | Marathe et al. | |
| 2009/0016519 A1* | 1/2009 | Bedingfield et al. | 379/216.01 |
| 2009/0047932 A1 | 2/2009 | McNamara et al. | |
| 2009/0052415 A1 | 2/2009 | Ishii et al. | |
| 2009/0109903 A1 | 4/2009 | Vikberg et al. | |
| 2009/0109959 A1* | 4/2009 | Elliott et al. | 370/352 |
| 2009/0265543 A1* | 10/2009 | Khetawat et al. | 713/151 |
| 2009/0280789 A1* | 11/2009 | Takuno et al. | 455/418 |
| 2010/0054442 A1* | 3/2010 | Wurster et al. | 379/207.02 |
| 2010/0067444 A1* | 3/2010 | Faccin et al. | 370/328 |
| 2010/0202446 A1* | 8/2010 | McCann et al. | 370/352 |
| 2011/0158223 A1* | 6/2011 | Liu et al. | 370/352 |
| 2011/0164743 A1* | 7/2011 | Darland et al. | 379/221.08 |
| 2012/0177195 A1* | 7/2012 | Elliott et al. | 379/240 |
| 2012/0307686 A1* | 12/2012 | Kung et al. | 370/259 |
| 2013/0070757 A1* | 3/2013 | Elliott et al. | 370/352 |

FOREIGN PATENT DOCUMENTS

| | | |
|---|---|---|
| WO | WO 98/25392 A2 | 6/1998 |
| WO | WO 03/039106 A2 | 5/2003 |
| WO | WO 2008/013977 A2 | 1/2008 |
| WO | WO 2008/103333 A1 | 8/2008 |
| WO | WO 2008/103334 A1 | 8/2008 |
| WO | WO 2008/103337 A1 | 8/2008 |
| WO | WO 2008/130709 A2 | 10/2008 |

OTHER PUBLICATIONS

Notice of Allowance and Fee(s) Due for U.S. Appl. No. 11/881,726 (Jun. 11, 2009).

Notification of Transmittal of the International Search Report and the Written Opinion of the International Searching Authority, or the Declaration for International Application No. PCT/US07/16974 (Sep. 11, 2008).

Notification of Transmittal of the International Search Report and the Written Opinion of the International Searching Authority, or the Declaration for International Application No. PCT/US08/02150 (May 20, 2008).

Notification of Transmittal of the International Search Report and the Written Opinion of the International Searching Authority, or the Declaration for the International Application No. PCT/US08/02154 (May 20, 2008).

Notification of Transmittal of the International Search Report and the Written Opinion of the International Searching Authority, or the Declaration for International Application No. PCT/US08/02147 (May 20, 2008).

"Mobile Wireless Overview," Cisco IOS Mobile Wireless Configuration Guide, pp. MWC-1-MWC-8 (Publication Date Unknown).

Final Official Action for U.S. Appl. No. 11/731,772 (Mar. 25, 2010).

Notification of Transmittal of the International Search Report and the Written Opinion of the International Searching Authority, or the Declaration for International Application No. PCT/US2009/046038 (Jan. 21, 2010).

"Digital Cellular Telecommunications System (Phase 2+); Universal Mobile Telecommunications System (UMTS); Network Architecture," 3GPP TS 23.002 version 7.1.0 Release 7, ETSI TS 123 002 (Mar. 2006).

"INAP-Feature Module," Cisco MGC Software Release 9.5(2) pp. 1-16 (Dec. 3, 2003).

Marshall et al., "SIP Extensions for Supporting Distributed Cell State," SIP Working Group, Internet Draft, pp. 1-12 (Aug. 2001).

Liao et al, "SS7-TCAP/IP Interworking," Internet Engineering Task Force, pp. 1-14 (Mar. 1999).

Final Official Action for U.S. Appl. No. 12/106,807 (Feb. 15, 2011).

Official Action for U.S. Appl. No. 11/731,800 (Jan. 18, 2011).

Official Action for U.S. Appl. No. 11/731,768 (Nov. 26, 2010).

Official Action for U.S. Appl. No. 12/016,807 (Aug. 5, 2010).

Notification of Transmittal of the International Search Report and the Written Opinion of the International Searching Authority, or the Declaration for International Application No. PCT/US2008/005176 (May 25, 2010).

Restriction and/or Election Requirement for U.S. Appl. No. 12/106,807 (Apr. 28, 2010).

"Interface Recommendation for Intelligent Network Capability Set 3: SCF-SSF Interface," ITU-T, Q.1238.2, pp. 7-9, 73-76, and 85-10 (Jun. 2000).

Second Office Action for Chinese Application No. 200880012488,2 (Dec. 28, 2012).

Noting of loss of rights pursuant to Rule 112(1) EPC for European Application No. 08725747.3 (Aug. 28, 2012).

Notice of Allowance and Fee(s) Due for U.S. Appl. No. 11/731,772 (Mar. 15, 2012).

Examiner-Initiated Interview Summary for U.S. Appl. No. 11/731,772 (Feb. 24, 2012).

First Office Action for Chinese Patent Application No. 200880012488.2 (Feb. 15, 2012).

Extended European Search Report for European Application No. 08725747.3 (Dec. 23, 2011).

Notice of Abandonment for U.S. Appl. No. 12/106,807 (Sep. 1, 2011).

Non-Final Official Action for U.S. Appl. No. 11/731,772 (Aug. 24, 2011).

Notice of Abandonment for U.S. Appl. No. 11/731,800 (Aug. 3, 2011).

Notice of Allowance and Fee(s) Due for U.S. Appl. No. 11/731,768 (Aug. 1, 2011).

Notice of Allowance and Fee(s) Due for U.S. Appl. No. 11/731,768 (Apr. 22, 2011).

Supplementary European Search Report for European Patent No. 2 119 212 (Dec. 6, 2010).

* cited by examiner

METHODS, SYSTEMS, AND COMPUTER READABLE MEDIA FOR PROVIDING NEXT GENERATION NETWORK (NGN)-BASED END USER SERVICES TO LEGACY SUBSCRIBERS IN A COMMUNICATIONS NETWORK

PRIORITY CLAIM

This application claims the benefit of U.S. Provisional Patent Application No. 61/058,045, filed on Jun. 2, 2008, the disclosure of which is incorporated herein by reference in its entirety.

TECHNICAL FIELD

The subject matter described herein relates to applying NGN-based telecommunications services to calls made by legacy equipment. More particularly, the subject matter described herein relates to methods, systems, and computer readable media for providing NGN-based end user services to legacy subscribers in a communications network.

BACKGROUND

Presently, telecommunications service providers are operating networks that support a significant number of subscribers. A considerable number of these network subscribers may be classified as legacy subscribers, i.e., subscribers that utilize legacy telecommunications equipment, such as PSTN phones or other similar non-Internet protocol (IP) phones. Because such a significant portion of the service provider's customer base includes legacy subscribers, service providers realize the benefits of providing advanced subscriber services (e.g., call forwarding service, find me/follow me service, voice mail, anonymous call rejection, etc.) to legacy users.

However, present day networks that are capable of handling 2G/PSTN calls cannot host advanced end-user type services to subscribers utilizing legacy equipment without requiring a subscriber to use an IP phone or installing extra network equipment on the subscriber side. Alternatively, a network provider could provide advanced network services to legacy subscribers by installing trigger-based network elements near the border of the network which generate Signaling System 7 (SS7) transaction capabilities application part (TCAP) or mobile application part (MAP) queries that then require SS7-NGN interworking processing, but this plan of action would be extremely cost prohibitive considering the number of network elements that would have to be replaced as such Intelligent Network (IN) service triggers are expensive for carriers to implement.

Accordingly, there exists a need for improved methods, systems, and computer readable media for providing NGN-based services to legacy subscribers in a communications network.

SUMMARY

The subject matter described herein includes methods, systems, and computer readable media for providing NGN-based end user services to legacy subscribers in a communications network. According to one aspect, the subject matter described herein includes a method for providing NGN-based end user services to legacy subscribers in a communications network that includes, at a service creation system (SCS) node having at least one processor, using the at least one processor for receiving a SS7 call setup signaling message associated with a call involving a legacy subscriber access device and holding the SS7 call setup signaling message. The method also includes, while holding the SS7 call setup signaling message, generating a SIP call setup message related to the SS7 call setup signaling message, and initiating the providing of at least one NGN-based end user service for the call using the SIP call setup signaling message. The method further includes determining whether to modify the SS7 call setup signaling message based on the at least one NGN-based end user service, and, in response to determining to modify the SS7 call setup signaling message, modifying the SS7 call setup signaling message, and routing the SS7 call setup signaling message towards a destination.

As used herein, the term "NGN-based end user service" refers to a service provided to telecommunications end users using a node that is not typically accessible by legacy end user devices, such as black phones. An example of such a node is IP node, such as a SIP application server. Examples of NGN-based end user services include "front of phone book" services, such as call logging, call forwarding, call waiting, call blocking, blacklist or whitelist services, add media or short code dial service, find me service, voice-to-text transcription service, and follow me service.

The subject matter described herein for providing NGN-based end user services to legacy subscribers in a communications network may be implemented using a computer readable medium having stored thereon executable instructions that when executed by the processor of a computer control the computer to perform steps. Exemplary computer readable media suitable for implementing the subject matter described herein includes disk memory devices, chip memory devices, programmable logic devices, and application specific integrated circuits. In one implementation, the computer readable medium may include a memory accessible by a processor. The memory may include instructions executable by the processor for implementing any of the methods for providing NGN-based end user services described herein. In addition, a computer readable medium that implements the subject matter described herein may be located on a single device or computing platform or may be distributed across multiple physical devices and/or computing platforms.

BRIEF DESCRIPTION OF THE DRAWINGS

Preferred embodiments of the subject matter described herein will now be explained with reference to the accompanying drawings of which.

DETAILED DESCRIPTION

Figure 1:
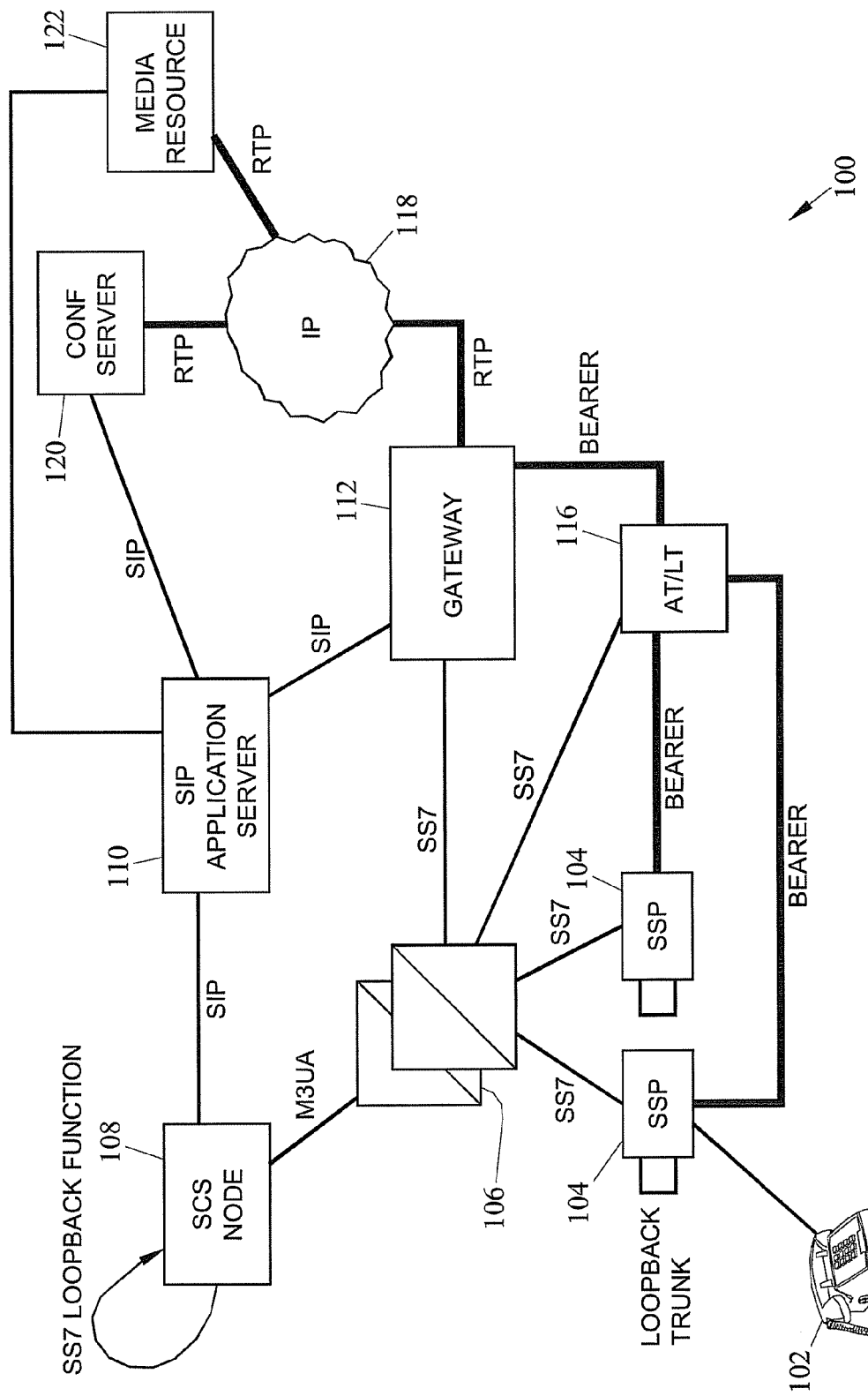
FIG. 1 depicts exemplary architecture of a communications system for providing NGN-based end user services to legacy subscribers in a communications network according to an embodiment of the subject matter described herein.

The present subject matter relates to systems, methods, and computer readable media for providing next generation network (NGN) based services to legacy subscribers in a communications network. FIG. 1 depicts an exemplary architecture of a network 100 configured to provide NGN-based end user services to legacy subscribers in accordance with an embodiment of the present subject matter. Network 100 may include a plurality of network elements such as service switching points (SSP) 104, a signaling transfer point (STP) 106, a service creation system (SCS) node 108, an application server 110, a gateway 112, an access tandem/local tandem (AT/LT) 116, a conference server 120, and a media resource server 122. In one embodiment, network 100 may also include an Internet protocol (IP) network 118, a session initiation protocol (SIP) network, an IP multimedia subsystem (IMS) network, or any combination thereof or the like.

In one embodiment, a legacy subscriber device 102 (e.g., a PSTN, GSM, IS-41 or other non-IP phone) is used by a subscriber to initiate a call. Legacy subscriber device 102 may also be referred to as a black phone. In response to receiving an off hook signal and called party number from subscriber device 102, SSP 104 generates a call setup signaling message (e.g., an ISDN user part (ISUP) initial address message (IAM), an SS7 call setup signaling message, and IETF SIGTRAN message, etc.) that is sent to STP 106. As used herein, an SS7 call setup signaling message includes any message associated with the initiation of a call or communications session. Notably, a call setup signaling message is distinguishable from other signaling messages, such as TCAP messages intended to query database structures.

SSP 104 may include any end-office switch or like network element that is responsible for generating call setup signaling messages associated with call setup and call teardown operations in an SS7-based telecommunications network. Similarly, STP 106 may represent a single STP or an STP pair that is commonly employed in telecommunications networks for routing, screening, and redirecting call signaling messages. Although FIG. 1 only depicts a single STP 106, additional STP pairs or standalone STPs may be used in system 100. Furthermore, any other type of network routing node capable of routing SS7 signaling messages, such as a SIP-SS7 router or gateway, SS7-IP multimedia subsystem (IMS) node, a session border controller (SBC), a PSTN breakout gateway controller (BGC), and the like, may be implemented in system 100 in the place of STP 106 without departing from the scope of the present subject matter.

After receiving the call setup signaling message (e.g., an ISUP IAM), STP 106 may redirect the message intended for the called party to SCS node 108. The receiving SCS node 108 may include a cluster of servers that operate in a load-sharing mode that handles call setup signaling messages from STP 106. In one embodiment, SCS node 108 includes a software module that receives and processes ISUP messages, maintains/enforces rules for accessing end-user services where the end-user service may be hosted on application server 110. SCS node 108 may also provide any protocol interworking/translation functionality (e.g., ISUP-to-SIP) needed to communicate with application server 110. STP pair 106 may be connected to SCS node 108 via SS7-IP signaling links such as SIGTRAN links (e.g., M3UA, SUA) or M2PA links, which may be utilized to forward call setup signaling messages to SCS node 108. In an alternate embodiment, SCS node 108 may be a component located within STP 106.

As mentioned above, SCS node 108 is responsible for determining whether NGN-based end user services should be applied to a given call. For example, by inspecting the calling and called party numbers in a received signal message, SCS node 108 is able to ascertain if the calling party, the called party, or both are subscribed to one or more NGN services. In one embodiment, SCS node 108 cross-references the calling and called party numbers to entries of a database containing telephone numbers of subscribers that are subscribed to NGN-based end user services. NGN-based end user services may include, but are not limited to, a call forwarding service, a find me/follow me service, a voice mail service, a number portability service, a call redirect service, a call later service, a media access service, blacklist/whitelist, call blocking, voice-to-text transcription service, and the like.

If SCS node 108 determines that at least one NGN-based end user is to be applied to the call, SCS node 108 signals application server 110 to initiate the providing of the NGN-based end user service. In one example, SCS node 108 generates and sends an INVITE message (e.g., a SIP INVITE message) to application server 110 (e.g. a SIP application server). Application server 110 may provide the NGN-based end user service. Application server 110 may then signal back to SCS node 108 with call control instructions or call modification parameters. SCS node 108 may then apply the call control instructions and/or modify one or more parameters contained in the buffered ISUP message in accordance with the provided NGN service. For example, if the solicited NGN service requires termination of the call, the SCS may discard the ISUP IAM, and may further generate an ISUP RELEASE message that instructs the originating SSP/switch to terminate the call. In cases where parameters in the ISUP IAM message are modified by the SCS node, the modified ISUP IAM message is routed towards a destination network element. More detailed examples of different NGN-based end user services that may be provided will be described below. If SCS node 108 determines that an NGN-based end user service is not to be applied to the call, SCS node 108 may route the call setup message towards a destination network element without modification.

In one exemplary implementation, SCS node 108 generates a SIP INVITE message to initiate a new session with application server 110. In response to the INVITE message, application server 110 may determine the type of service required and send an INVITE message to SCS node 108 for initiating yet another session for providing the determined service type. SCS node 108 may correlate the two INVITE messages, compare parameters to identify differences, and use the differences to modify parameters in the received SS7 call setup signaling message for providing the identified service type for the call. Examples of providing different NGN-based end user services will be described in detail below.

Figure 2:
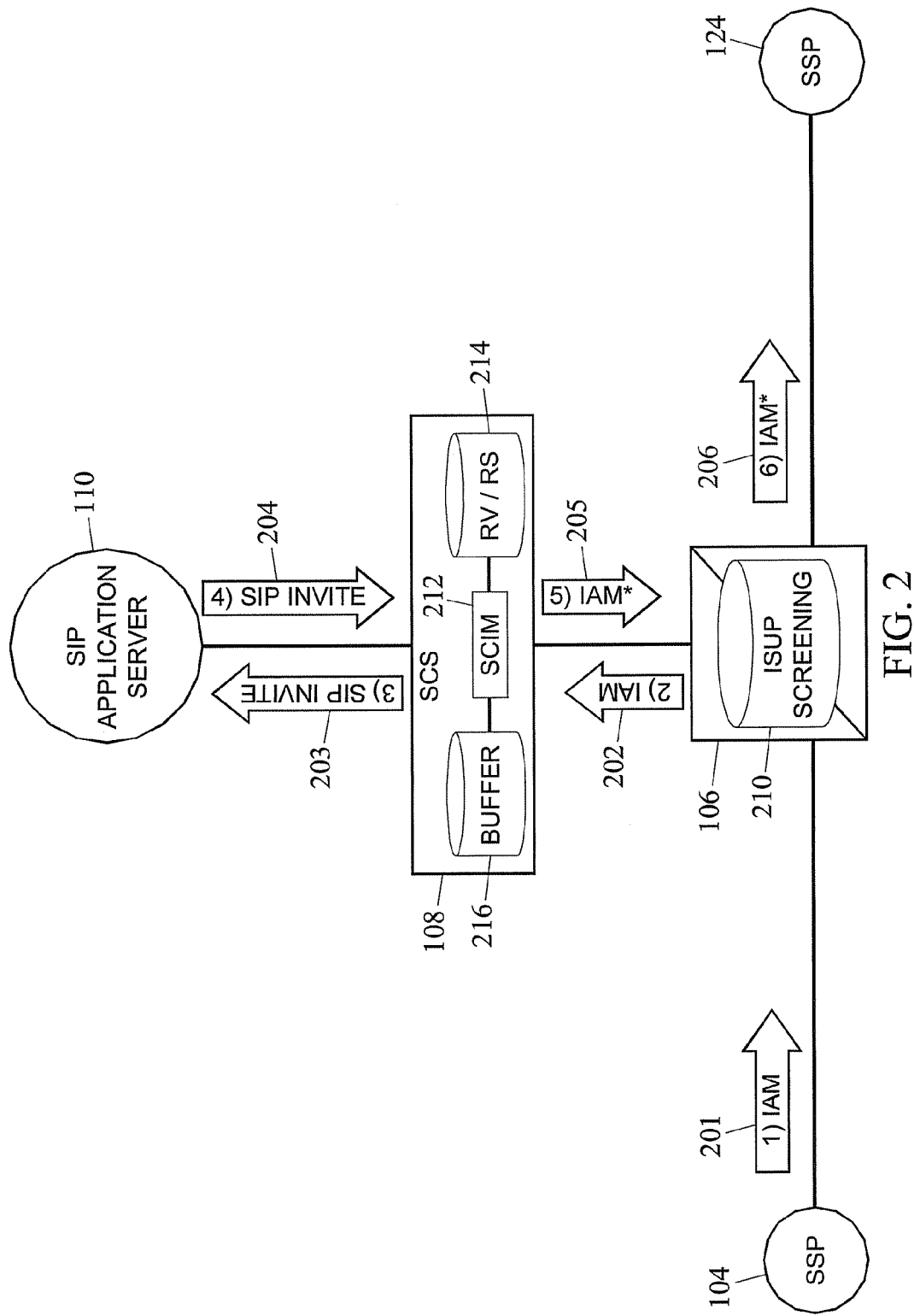
FIG. 2 is a block diagram depicting the interaction of network elements that provide NGN-based end user services to legacy subscribers according to an embodiment of the subject matter described herein.

FIG. 2 illustrates the communication between the network elements of network 100 in greater detail. In one embodiment, an originating switching office (e.g., SSP 104) transmits an ISUP IAM 201 intended for a terminating switching office (e.g., SSP 124). In this particular scenario, it is understood that IAM 201 is generated by SSP 104 in response to a call request made by a subscriber using legacy phone equipment, such as a non-IP phone. Similarly, it is appreciated that SSP 124 is the end office switch that handles calls to the intended called party. In one embodiment, message 201 may include an originating point code (OPC), a destination point code (DPC), a circuit identification code (CIC), a calling party number (CgPN), a called party number (CdPN), and the like.

Upon receiving message 201, STP 106 utilizes an ISUP screening module 210 to determine if the call setup signaling message is an appropriate message for processing. In this scenario, message 201 is redirected to SCS node 108 (which is shown as IAM 202 in FIG. 2).

SCS node 108 processes IAM 202 and determines whether there is a need to provide at least one NGN-based end user service to the call. For example, SCS node 108 may inspect message 202 for certain parameters, such as the calling party identifier and called party identifier, to determine if any of the subscribers associated with these identifiers/numbers have a subscription to at least one NGN-based end user service. In one embodiment, these identifiers may be listed in a call context database (e.g., rules database 214) that is accessed by SCS node 108. For example, the stored call context data may contain a list (and an order) of service applications to be invoked for a given call. In one embodiment, SCS node 108 includes a service capability interaction manager (SCIM) 212, rules database 214, buffer 216 that may be used to hold and process the received signaling messages. SCIM 212 includes buffers received signaling messages, generates one or more service requests based on the received signaling messages, obtains responses, and modifies or forwards the received signaling messages. An exemplary commercially available platform that provides such SCIM architecture is the Eagle XG Service Broker Platform available from Tekelec of Morrisville, N.C. Exemplary functionality of the SCIM is described in commonly assigned co-pending U.S. patent application Ser. No. 12/106,807 filed on Apr. 21, 2008, the disclosure of which is incorporated herein by reference in its entirety.

If at least one NGN-based end user service is to be applied to the call, SCS node 108 may generate a SIP INVITE message 203. Message 203 is then sent to engage an application server, such as SIP application server 110, so that the appropriate NGN services can be applied to the call. Message 203 may include an SCS tag that can be used by SCS node 108 to later correlate messages received from application server 110.

After receiving SIP INVITE message 203, application server 110 may send messages to one or more databases and/or servers in order to provide all of the subscribed services that are to be applied to the call. For example, if a call forwarding service needs to be applied to the call, application server 110 may transmit a request message to a subscriber services database (not shown) in order to obtain the applicable call forwarding data.

Once all the subscribed services have been initiated for the call, application server 110 generates a SIP INVITE message 204 that is directed to SCS node 108. In one embodiment, message 204 may include a new called party number (e.g., if a called forwarding or call redirect service was applied to the call) in addition to the SCS tag originally received in message 203.

Upon receiving message 204, SCS node 108 executes a correlation function in order to associate sent message 203 and received message 204. In one embodiment, SCS node 108 correlates the messages by comparing SCS codes contained within message 203 and message 204.

After performing the correlation function, SCS node 108 generates a modified IAM 205. In one embodiment, message 205 may be a modified to include a different called party number, such as the number obtained from the call forwarding service by application server 110. Modified message 205 is then sent to STP 106, which is responsible for forwarding message 206 (i.e., previously shown as message 205) to the appropriate SSP 124 (i.e., the end office switch responsible for handling calls directed to called party number C).

Figure 3:
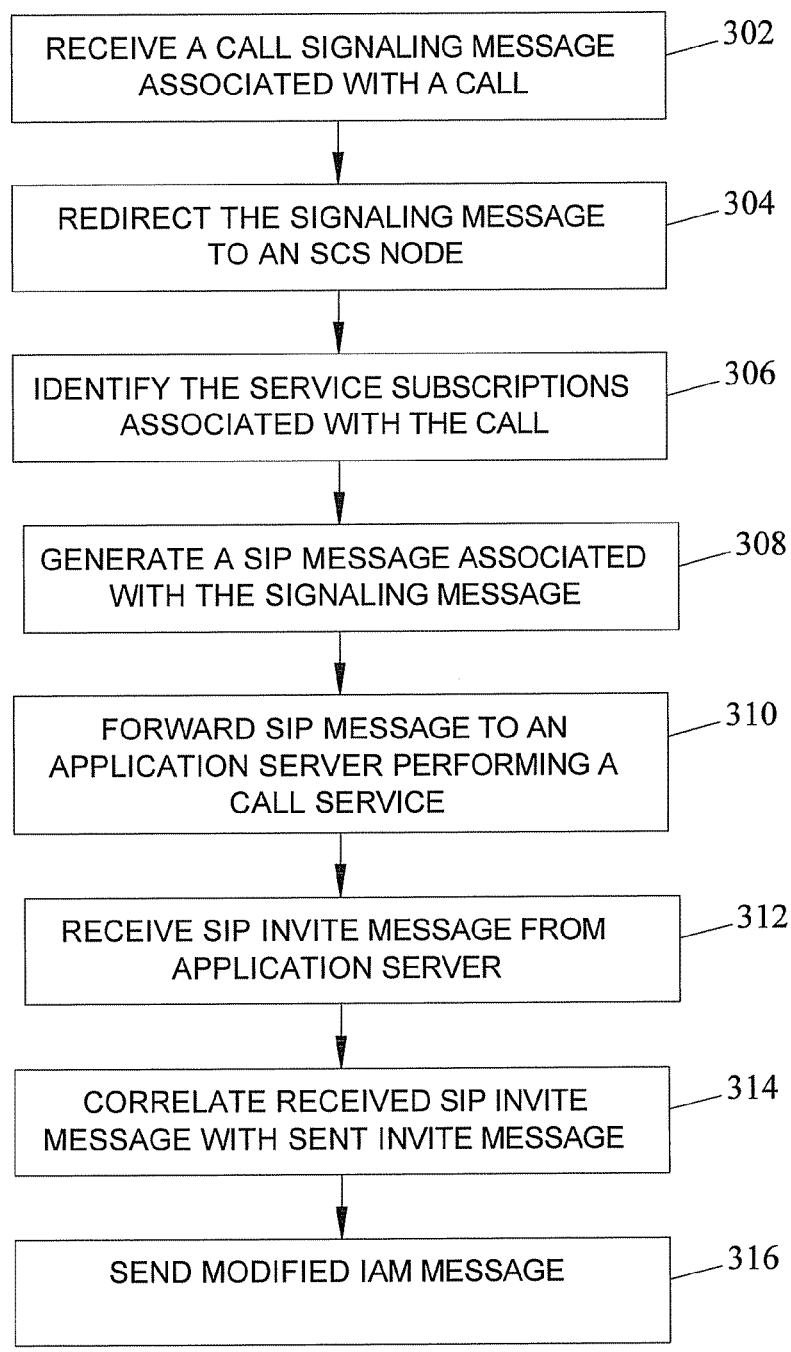
FIG. 3 depicts a flow chart detailing a method for applying NGN-based end user services to legacy subscribers in a communications network according to an embodiment of the subject matter described herein.

One example of providing NGN-based services to legacy subscribers in a communications network is depicted as method 300 in FIG. 3. In one embodiment, an SCS node having at least one processor, may use the at least one processor to perform method 300. In block 302, a call setup message is received. In one embodiment, STP 106 receives an SS7 call setup signaling message from a calling subscriber via SSP 104. For example, the call setup message may comprise an ISUP IAM that includes an OPC, DPC, CIC, calling party number, and called party number. In one embodiment, the call setup message is associated with a calling legacy subscriber access device.

In block 304, the call setup message is redirected to an SCS node. In one embodiment, STP 106 uses ISUP screening module 210 to redirect the call setup message to SCS node 108. In block 306, the service subscriptions associated with the call setup message are identified. In one embodiment, SCS node 108 holds the call setup signaling message and cross-references the calling and called party numbers contained in the received signaling message to database entries listing subscribers of NGN-based end user services. Message buffer 216 illustrated in FIG. 2 of SCS node 108 may receive and hold the call setup signaling message while it is determined whether modification of the message in light of an NGN-based end user service is required. For some services, such as call logging, the NGN-based end user services may be provided by application server 110 while the received ISUP message is held, and the ISUP message may be forwarded to its destination unmodified because the underlying service (call logging) does not require modification of the ISUP message to be achieved.

In block 308, while holding the SS7 call setup signaling message, SCS node 108 generates a SIP call setup signaling message (which is related to the SS7 call setup message) if any subscriber services associated with the called party number, the calling party number, or both are found. In one embodiment, the SIP call setup signaling message includes a SIP INVITE message. As used herein, a SIP call setup signaling message relates to a SIP message used to initiate a dialog or session between called and calling parties, rather than a query used to obtain information from a database.

In block 310, the SIP INVITE message is sent to application server 110, which initiates the providing of at least one subscribed NGN-based end user service to the call. In one embodiment, the SIP INVITE message includes calling and called party numbers and an SCS tag identifier. Blocks 308 and 310 may be implemented by SCIM 212 illustrated in FIG. 2.

In block 312, application server 110 sends a SIP INVITE message to SCS node 108 containing the SCS tag identifier and a new called party number, if applicable. For example, if a call forwarding service was utilized, then the SIP INVITE message may include the called party number to which the call should be forwarded.

In block 314, SCS node 108 correlates the received SIP INVITE message with the original SIP INVITE message sent to application server 110. In one embodiment, the SCS node may correlate the first SIP INVITE message with the second SIP INVITE message and compare the first and second SIP INVITE messages to identify the presence of information regarding the at least one NGN-based end user service. For example, SCS node 108 may correlate the INVITE message using SCS tag identifiers and may compare the two INVITE messages for differences in order to determine whether to modify the SS7 call setup message. For example, SCS node 108 may compare two INVITE messages to determine differences between the INVITE messages and to identify parameters associated with the NGN-based end user service. Continuing with the call forwarding example, if SCS 108 determines that the INVITE message from application server 110 includes a new called party number, the SCS 108 may determine that the SS7 call setup signaling message should be modified to include the new called party number.

In block 316, SCS node 108 routes the SS7 call setup message towards a destination. In one embodiment, the SCS node 108 sends a modified IAM to SSP 124. The modified IAM may include the new call forwarded to called party number. Blocks 314 and 316 may be implemented by SCIM 212 illustrated in FIG. 2.

Figure 4:
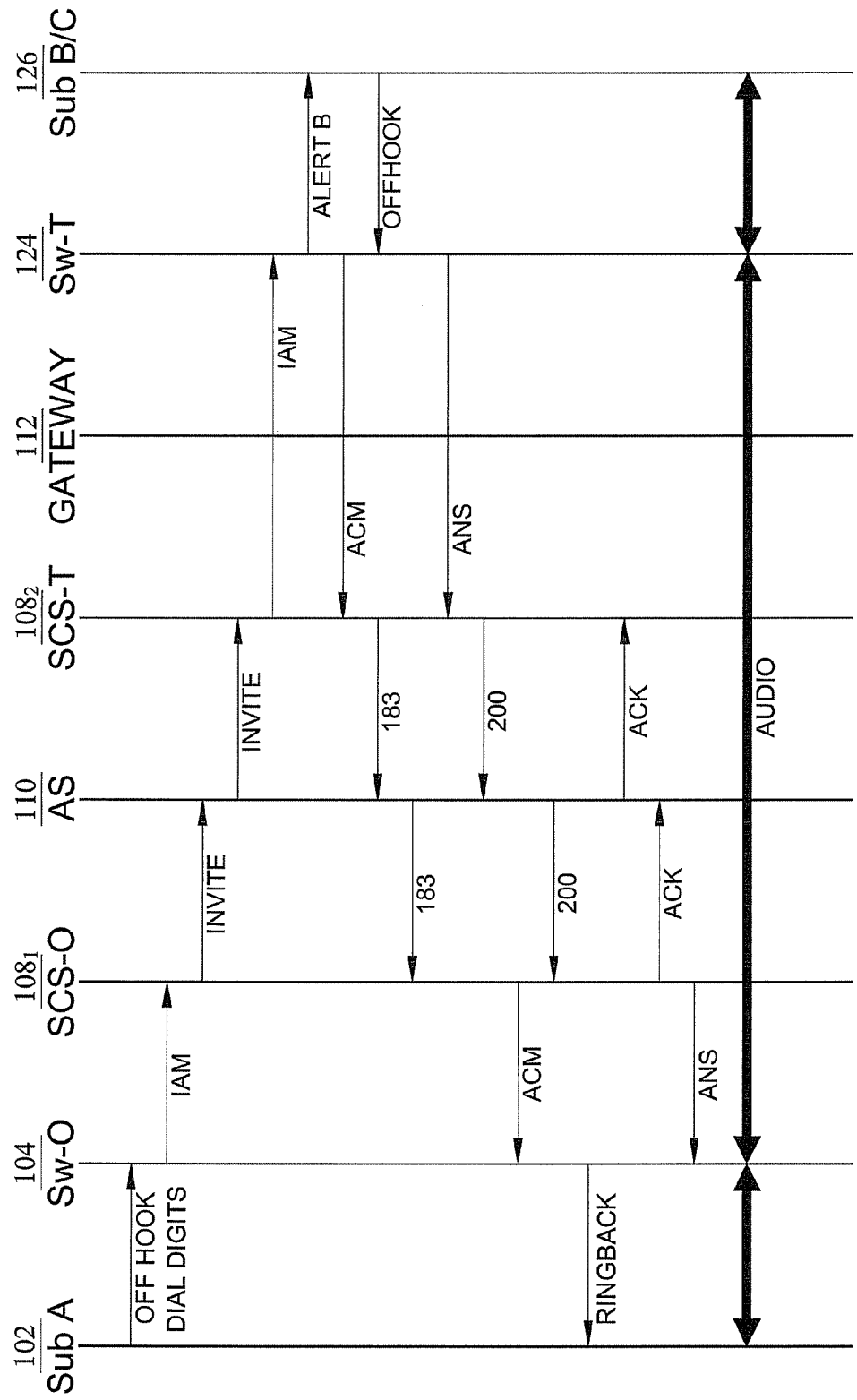
FIG. 4 depicts a call flow diagram of a normal call setup according to an embodiment of the subject matter described herein.

To better illustrate how the present subject matter is utilized, a number of exemplary call flow diagrams are presented. For example, FIG. 4 depicts a normal call setup where a subscriber A 102 calls a subscriber B 126. Referring to FIG. 4, subscriber A 102 picks up a PSTN phone, initiates an off hook signal, and dials the phone number digits of subscriber B 126. The dialed digits are received by SSP 104 (i.e., the originating switching office) which then sends an ISUP IAM that includes the called party number (e.g., subscriber B's phone number) and the calling party number (e.g., subscriber A's phone number) to SCS node 108. The IAM is received by a call originating SCS instance executing on SCS node 108, referenced as SCS $108_1$. From SCS $108_1$, an INVITE message is sent to application server 110. Although not shown in this call flow diagram, application server 110 can apply NGN-based end user services (which are associated to the service subscription associated with subscriber A and/or subscriber B) to the call. Application server 110 responds by sending a SIP INVITE message to SCS node 108 (i.e., specifically a call terminating SCS instance executing on SCS node 108, referenced as SCS $108_2$).

Upon receiving INVITE message, SCS instance $108_2$ may send an IAM that contains modified information. In one embodiment, the modified information may include a modified called party number (e.g., a call forwarding number associated with the original called party). In this scenario, the terminating SSP 124 receives the modified IAM and transmits an alert to subscriber B 126. Subscriber B 126 picks up the phone, thereby sending an off hook signal to SSP 124, which then sends an answer (ANS) message to SCS instance $108_2$. After the exchange of a few other signaling messages (e.g., 183 and 200 type messages), a call path is established between subscriber A 102 and subscriber B 126 (as indicated by the dark black "audio" arrow in FIG. 4).

Figure 5:
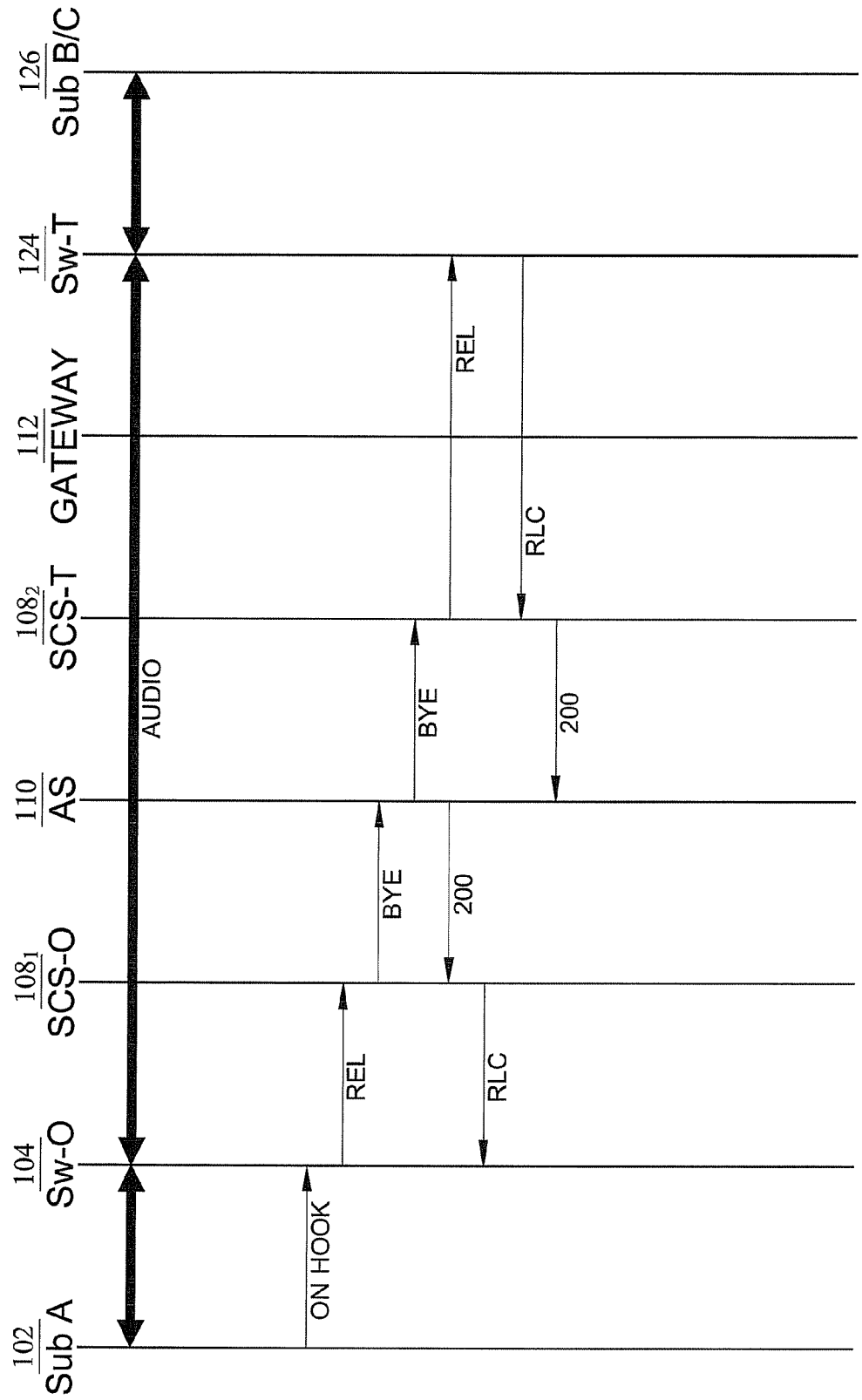
FIG. 5 depicts a call flow diagram of a calling party hang-up according to an embodiment of the subject matter described herein.

FIG. 5 is an exemplary call flow involving the present subject matter. Specifically, FIG. 5 depicts a call flow diagram depicting a calling party hang-up according to an embodiment of the subject matter described herein. For example, subscriber A 102 ends a call with subscriber B 126 by hanging up the phone, which initiates an on hook signal received by SSP 104. SSP 104 then generates a release message (REL) that is received by SCS node 108 (i.e., specifically SCS instance $108_1$). SCS instance $108_1$ responds by sending a BYE message to application server 110. In this scenario, application sever 110 logs the call and forwards the BYE message back to SCS node 108 (i.e., SCS instance $108_2$). SCS node 108 then generates and sends a REL message to SSP 124, which is the end office switch that provides service to subscriber B 126. SSP 124 sends a release confirmation message (RLC) to SCS 108, which in turn sends a 200 OK message to application server 110.

Figure 6:
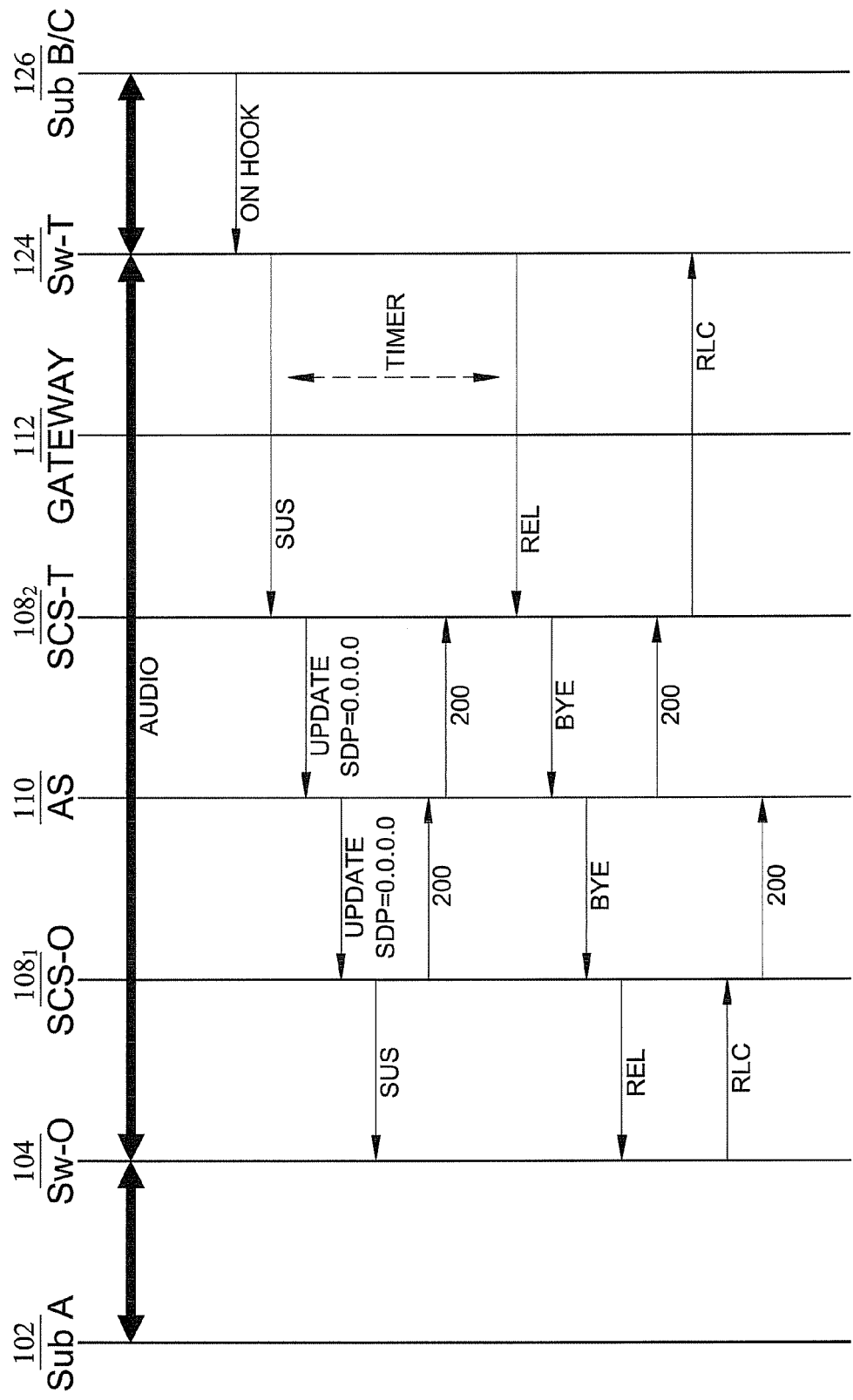
FIG. 6 depicts a call flow diagram of a called party hang-up according to an embodiment of the subject matter described herein.

FIG. 6 is an exemplary call flow involving the present subject matter. Specifically, FIG. 6 depicts a call flow diagram depicting a called party hang-up according to an embodiment of the subject matter described herein. For example, subscriber B 126 ends a call with subscriber A 102 by hanging up the phone, which initiates an on hook signal received by SSP 124. SSP 124 then generates a suspend message that is received by SCS node 108 (i.e., specifically SCS instance $108_2$). SCS instance $108_2$ then sends an UPDATE SDP message to application server 110. In this scenario, application sever 110 logs the call and forwards the UPDATE SDP message back to SCS node 108 (i.e., SCS instance $108_1$). SCS node 108 then generates and sends a suspend message to SSP 104, which is the end office switch that provides service to subscriber A 102.

After a predefined amount of time, a timer associated with the original suspend message expires and causes SSP 124 to issue a REL message to SCS 108. SCS instance $108_2$ then sends a BYE message to application server 110. In this scenario, application sever 110 logs the call and forwards the BYE message back to SCS node 108 (i.e., SCS instance $108_1$). SCS node 108 then generates and sends a REL message to SSP 104. SSP 104 then sends a release confirmation message (RLC) to SCS 108, which in turn sends a 200 OK message to application server 110.

Figure 7:
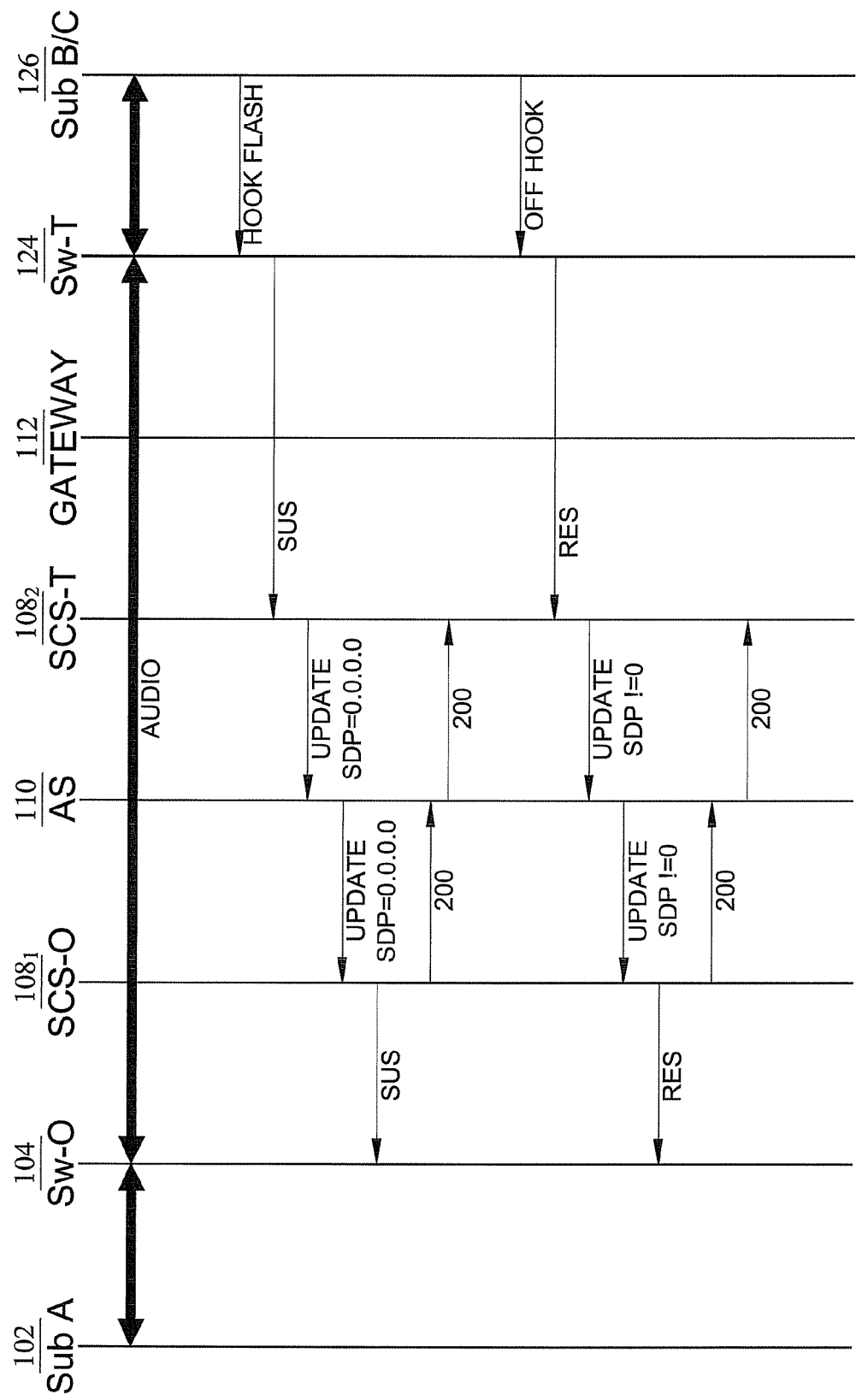
FIG. 7 depicts a call flow diagram illustrating a hold/resume function utilized during a normal call according to an embodiment of the subject matter described herein.

FIG. 7 is an exemplary call flow involving the present subject matter. Specifically, FIG. 7 depicts a call flow diagram depicting a hold/resume function according to an embodiment of the subject matter described herein. For example, subscriber B 126 places subscriber A 102 on hold by initiating a "flash" feature of the phone, which initiates a hook flash signal that is received by SSP 124. SSP 124 then generates a suspend (SUS) message that is received by SCS node 108 (i.e., specifically SCS instance $108_2$). SCS instance $108_2$ then sends an UPDATE SDP message to application server 110. In this scenario, application sever 110 logs the call and forwards the UPDATE SDP message back to SCS node 108 (i.e., SCS instance $108_1$). SCS node 108 then generates and sends a suspend message to SSP 104, which is the end office switch that provides service to subscriber A 102.

Before a predefined time expires (which would terminate the call on hold), subscriber B 126 picks up the phone to resume the call with subscriber A 102. This action sends an off hook signal to SSP 124 and causes SSP 124 to issue a resume (RES) message to SCS instance $108_2$. SCS instance $108_2$ then sends an UPDATE SDP message to application server 110. In this scenario, application sever 110 logs the call and forwards the UPDATE SDP message back to SCS node 108 (i.e., SCS instance $108_1$). SCS node 108 then generates and sends a RES message to SSP 104. SSP 104 then sends a release confirmation message 200 OK message to application server 110, which in turn sends a 200 OK message to SCS $108_2$.

Figure 8:
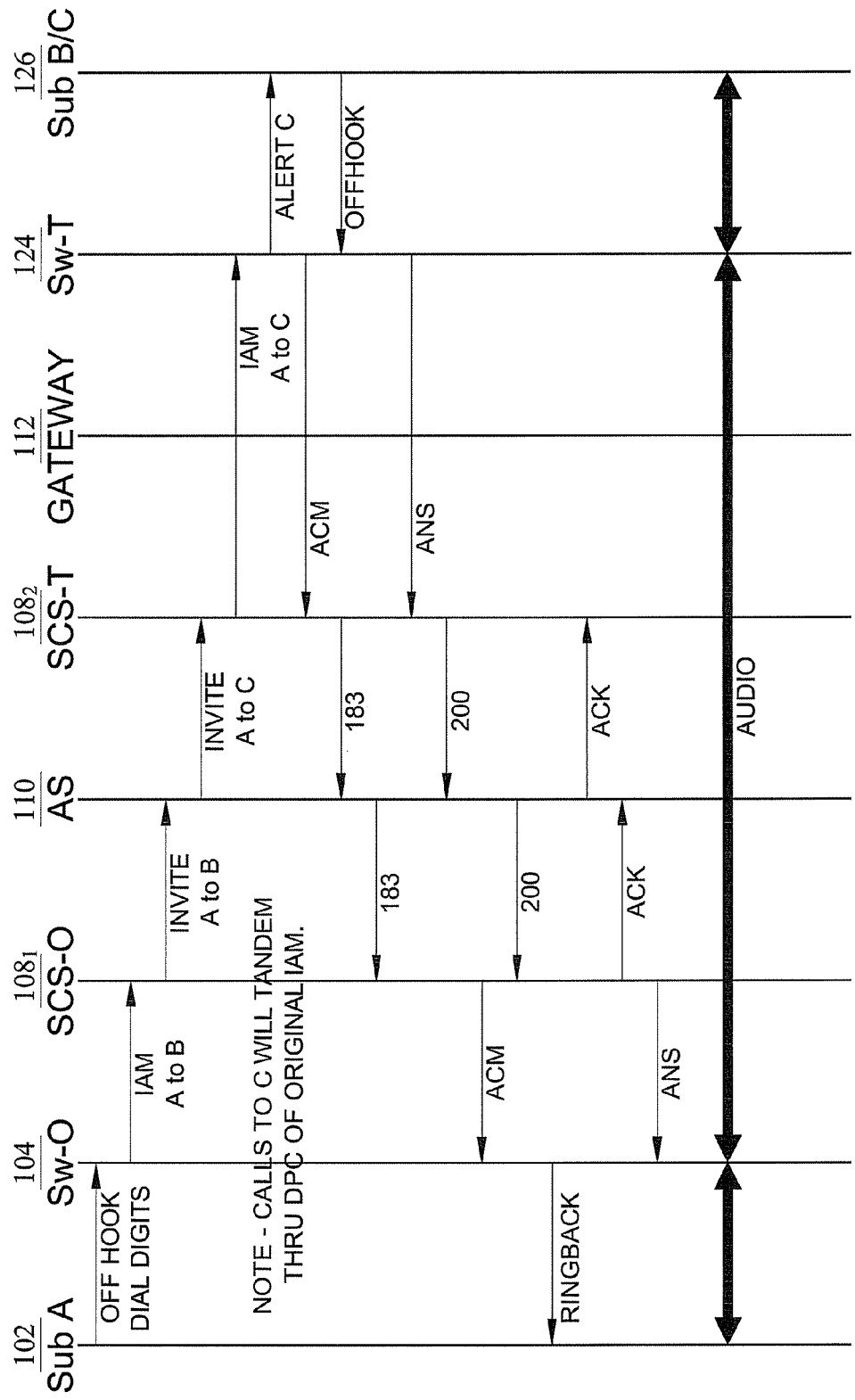
FIG. 8 depicts a call flow diagram illustrating the use of an immediate call forward function according to an embodiment of the subject matter described herein.

FIG. 8 is an exemplary call flow diagram pertaining to the present subject matter. Specifically, FIG. 8 depicts a call setup where a subscriber A 102 initially calls a subscriber B 126 and the call is then forwarded to a subscriber device C (which may be associated with subscriber B 126). Referring to FIG. 8, subscriber A 102 picks up the phone, initiates an off hook signal, and dials the phone number digits of subscriber B 126. The dial digits are received by SSP 104 which then sends an ISUP IAM that includes the called party number (e.g., subscriber B's phone number) and the calling party number (e.g., subscriber A's phone number) to SCS node 108. Specifically, the IAM is received by a first instance of SCS node 108, referenced as SCS $108_1$. From SCS instance $108_1$, an INVITE message is sent to application server 110. Although not shown in this call flow diagram, application server 110 logs the call and applies NGN end user services (which are associated to the service subscription associated with Subscriber A and/or Subscriber B) to the call. In this scenario, application server 110 applies a call forwarding service to the call. The call forwarding service provides a new called party number C.

Application server 110 responds by sending a SIP INVITE message to a SCS node 108 (i.e., specifically a second instance of SCS node 108, referenced as SCS $108_2$). It should be noted that some parameters in the INVITE message to SCS $108_2$ may have changed and therefore, does not correspond to the original ingress SIP INVITE message sent by SCS $108_1$. In this scenario, the INVITE message includes the new called forwarded number C.

Upon receiving INVITE message, SCS $108_2$ sends an IAM that contains modified information. In one embodiment, the modified information may include a modified called party number (e.g., a call forwarding number that may be associated with the original called party), i.e., called forwarded number C. The terminating SSP 124 receives the modified IAM and transmits an alert to subscriber device C. Subscriber device C is picked up, thereby sending an off hook signal to end office 124, which then sends an ANS message to SCS $108_2$. After the exchange of several call signaling messages (e.g., 183 and 200 type messages), a call path is established between subscriber A 102 and subscriber device C (as indicated by the dark black "audio" arrow in FIG. 9).

Figure 9:
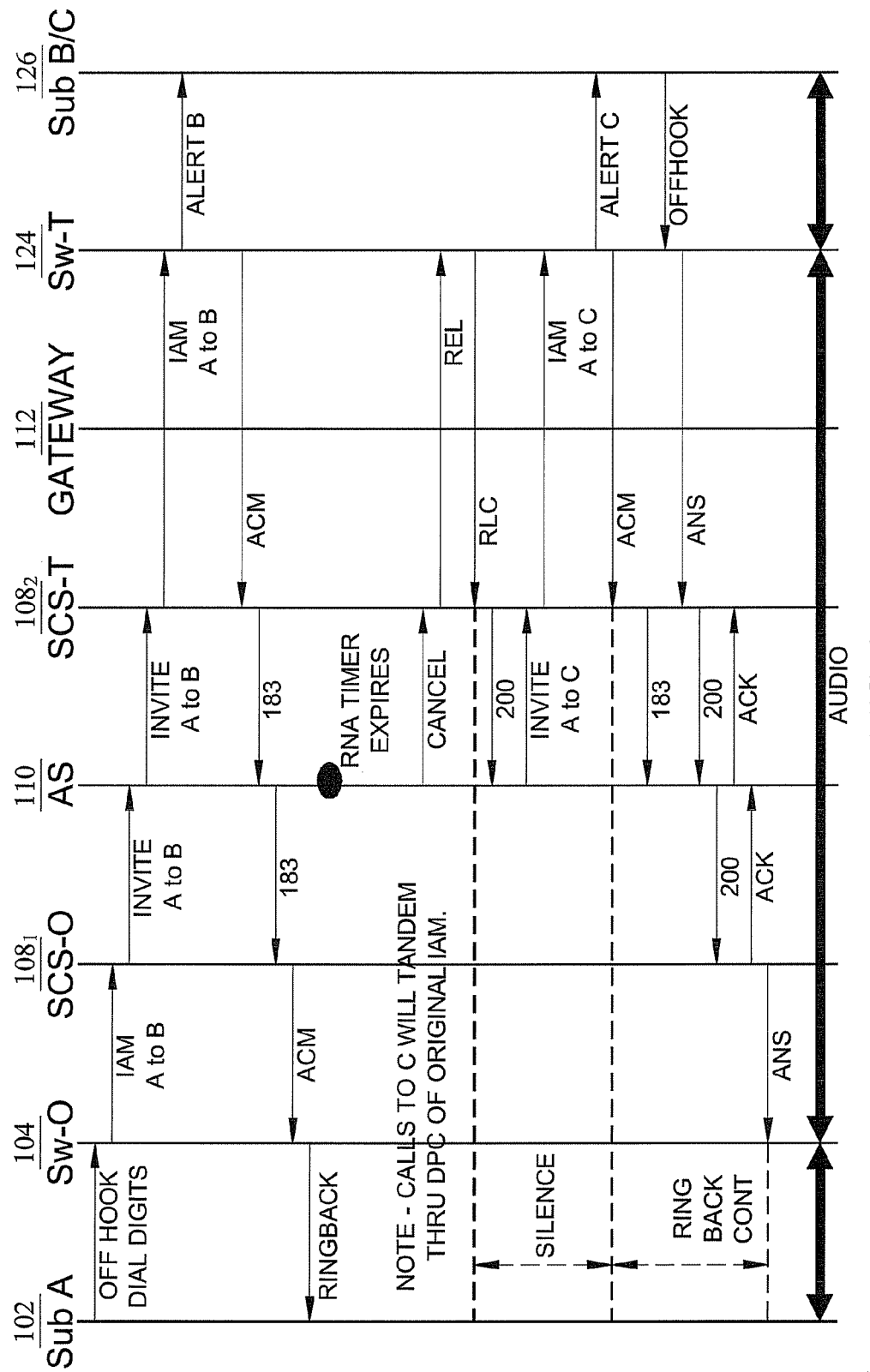
FIG. 9 depicts a call flow diagram of redirecting a call before a called party answer according to an embodiment of the subject matter described herein.

FIG. 9 is an exemplary call flow diagram pertaining to the present subject matter. Specifically, FIG. 9 depicts a call setup where a subscriber A 102 calls a subscriber B 126 but is redirected before subscriber B answers. Referring to FIG. 9, subscriber A 102 picks up the phone, initiates an off hook signal, and dials the phone number digits of subscriber B 126. The dial digits are received by SSP 104 which then sends an ISUP IAM that includes the called party number (e.g., subscriber B's phone number) and the calling party number (e.g., subscriber A's phone number) to SCS node 108 (i.e., SCS $108_1$). From SCS instance $108_1$, an INVITE message is sent to application server 110. Although not shown in this call flow diagram, application server 110 logs the call and applies advanced NGN services (which are associated to the service subscription associated with subscriber A and/or subscriber B) to the call. Application server 110 responds by sending a SIP INVITE message to a SCS node 108 (i.e., SCS $108_2$).

Upon receiving INVITE message, SCS instance $108_2$ sends an IAM. In this scenario, the terminating SSP 124 receives the IAM and transmits an alert to subscriber B 126. At this time, subscriber B 126 does not answer, and a "ring no answer" (RNA) timer expires at application server 110. Consequently, application server 110 sends a CANCEL message to SCS $108_2$, which in turn sends a release message to SSP 124 to terminate the call leg. SSP 124 responds with an RLC message that is directed to SCS $108_2$, which then generates a 200 OK message that is directed to application server 110. Application server 110 issues an INVITE message that is addressed to subscriber device C (e.g., subscriber B may have designated called party number C as a redirect number via a redirect service). The INVITE message is received by SCS $108_2$ and forwarded to SSP 124. Subscriber device C then receives an alert from SSP 124. Subscriber device C is picked up, thereby sending an off hook signal to SSP 124, which then sends an ANS message to SCS $108_2$. After the exchange of several call signaling messages (e.g., 183 and 200 type messages), a call path is established between subscriber A 102 and subscriber C 126 (as indicated by the dark black "audio" arrow in FIG. 10).

Figure 10:
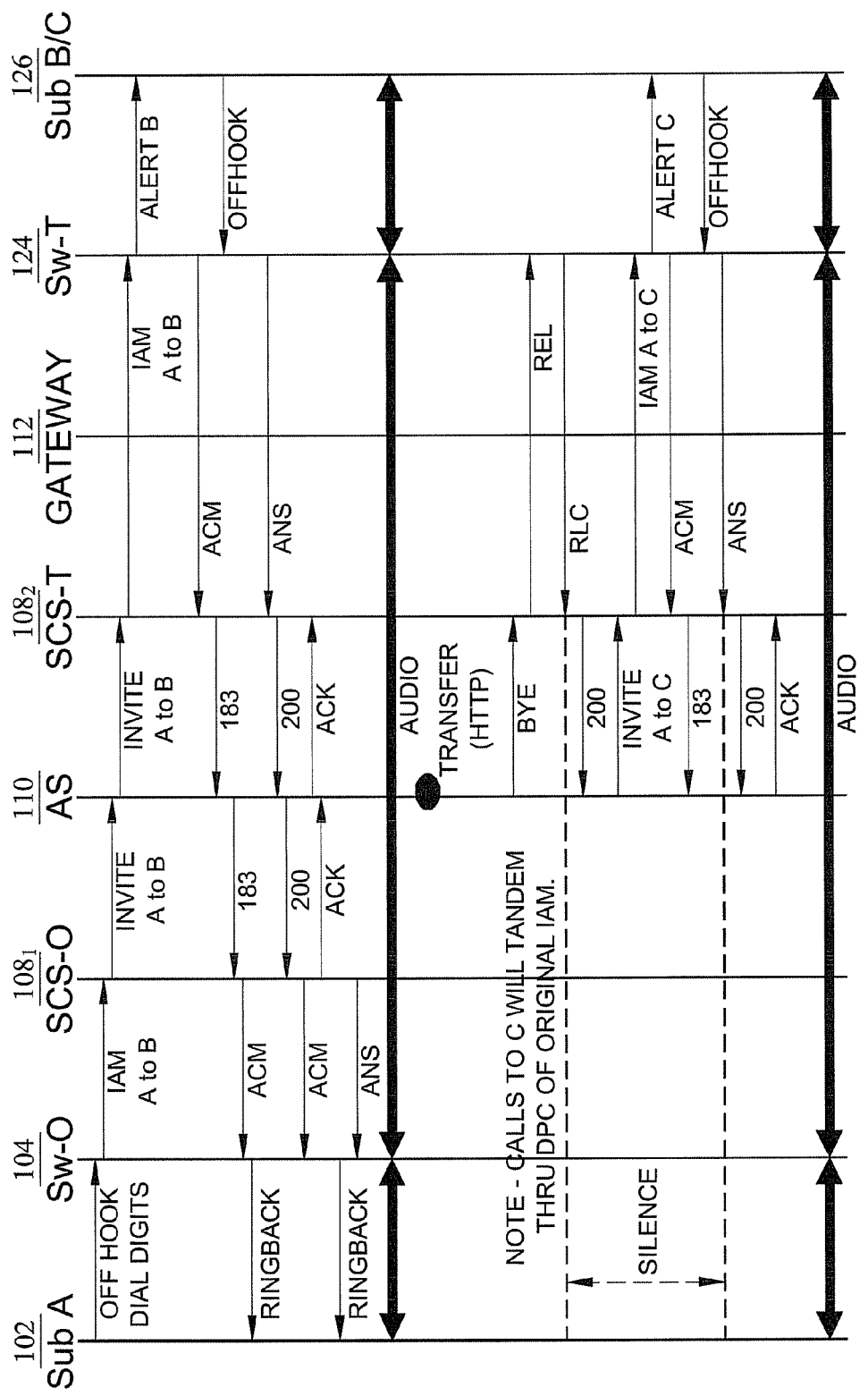
FIG. 10 depicts a call flow diagram of redirecting a call after a called party answer according to an embodiment of the subject matter described herein.

FIG. 10 is an exemplary call flow diagram pertaining to the present subject matter. Specifically, FIG. 10 depicts a call setup where a subscriber A 102 calls a subscriber B 126 but is redirected after subscriber B answers. Referring to FIG. 10, subscriber A 102 picks up the phone, initiates an off hook signal, and dials the phone number digits of subscriber B 126. The dial digits are received by SSP 104 which then sends an ISUP IAM that includes the called party number (e.g., subscriber B's phone number) and the calling party number (e.g., subscriber A's phone number) to SCS node 108 (i.e., SCS $108_1$). From SCS $108_1$, an INVITE message is sent to application server 110. Although not shown in this call flow diagram, application server 110 logs the call and applies advanced NGN services (which are associated to the service subscription associated with subscriber A and/or subscriber B) to the call. Application server 110 responds by sending a SIP INVITE message to a SCS node 108 (i.e., SCS $108_2$).

Upon receiving INVITE message, SCS $108_2$ sends an IAM. In this scenario, the terminating SSP 124 receives the IAM and transmits an alert to subscriber B 126. At this time, subscriber B 126 answers the phone and an off hook signal is received by SSP 124. SSP 124 sends an ACM and/or ANS message back to SCS 108 to establish a call path with subscriber A 102 (as indicated by the dark black "audio" arrow in FIG. 11).

At some point during the call, subscriber B clicks a button on a computer interface to transfer the call to a subscriber C. Application server 110 releases the call by generating a BYE message that is received by SCS $108_2$, which in turn sends a release message to SSP 124. SSP 124 responds by transmitting an RLC message back to SCS $108_2$, which then provides a 200 OK message to application server 110. Application server 110 sends a new INVITE message indicating that the new called party is subscriber C (which was designated with the earlier transfer function). SCS node 108 receives the INVITE message and subsequently generates an associated IAM, which is sent to SSP 124. Subscriber device C then receives an alert from SSP 124. Subscriber C then picks up the phone, thereby sending an off hook signal to SSP 124, which then sends an ANS message to SCS $108_2$. Ultimately, a call path between subscriber A 102 and subscriber C is established.

Figure 11:
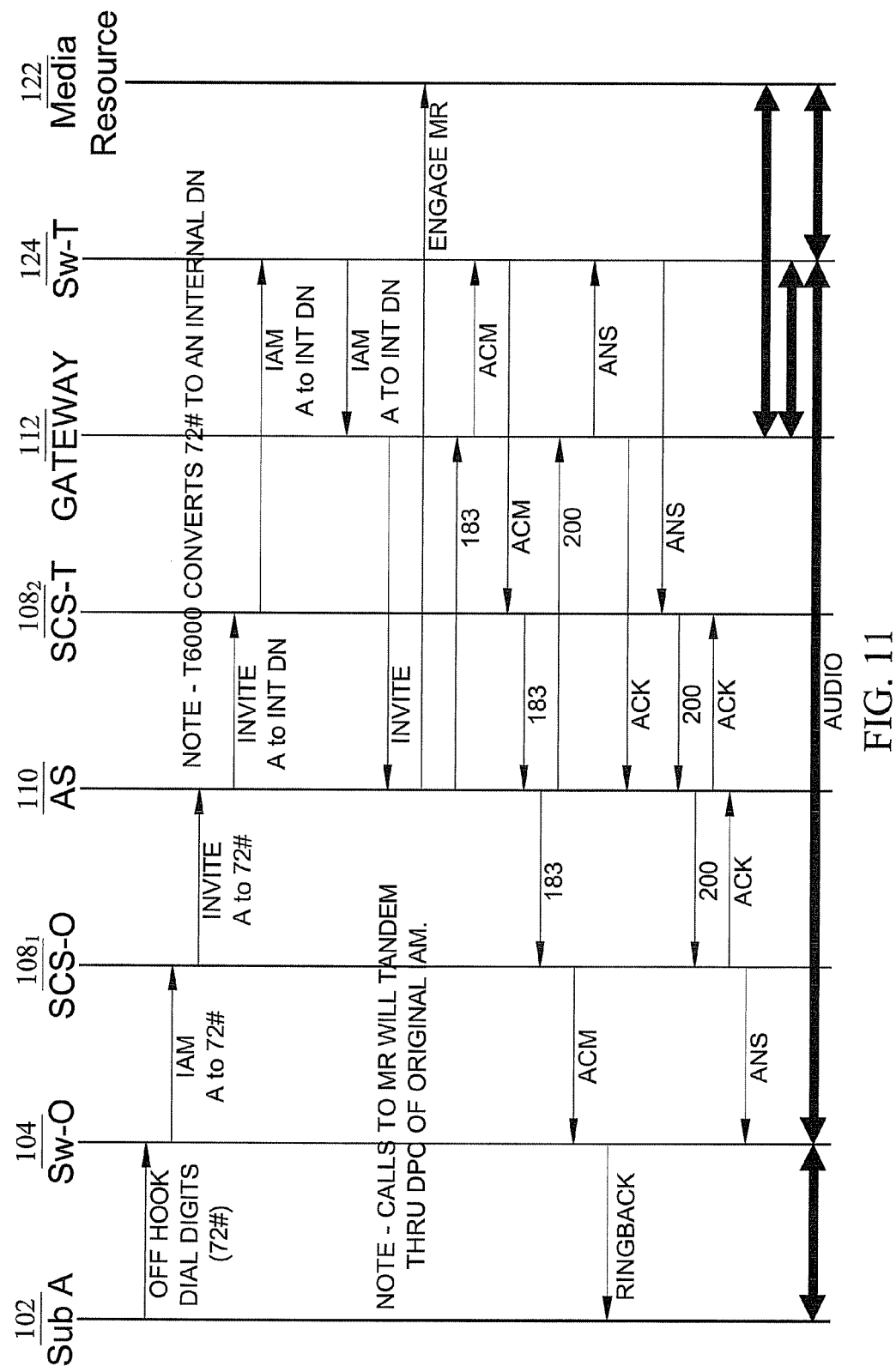
FIG. 11 depicts a call flow diagram of a short code dial according to an embodiment of the subject matter described herein.

FIG. 11 is an exemplary call flow diagram pertaining to the present subject matter. Specifically, FIG. 11 depicts a call where subscriber A 102 contacts a media resource 122. Referring to FIG. 11, subscriber A 102 picks up the phone, initiates an off hook signal, and dials the phone number digits associated with media resource 122. The dial digits are received by SSP 104 which then sends an ISUP IAM that includes the called party number (e.g., media server's phone number) and the calling party number (e.g., subscriber A's phone number) to SCS node 108 (i.e., SCS 108₁). From SCS 108₁, an INVITE message is sent to application server 110. Although not shown in this call flow diagram, application server 110 logs the call and may apply advanced NQN services to the call. In this scenario, application server 110 may convert the media resource number to an internal DN associated with media resource 122. Application server 110 responds by sending a SIP INVITE message containing this new information to SCS node 108 (i.e., SCS 108₂).

Upon receiving the INVITE message, SCS 108₂ sends an associated IAM to SSP 124. SSP 124 then sends the IAM to gateway 112, which in turn sends an INVITE message to application server 110. Application server 110 sends a signal to engage media resource 122. Ultimately a connection is made between media resource 122 and subscriber A 102. In one embodiment, this call connection may be established to permit subscriber A 120 to change one or more call services (e.g., call forwarding) without using a computer.

Figure 12:
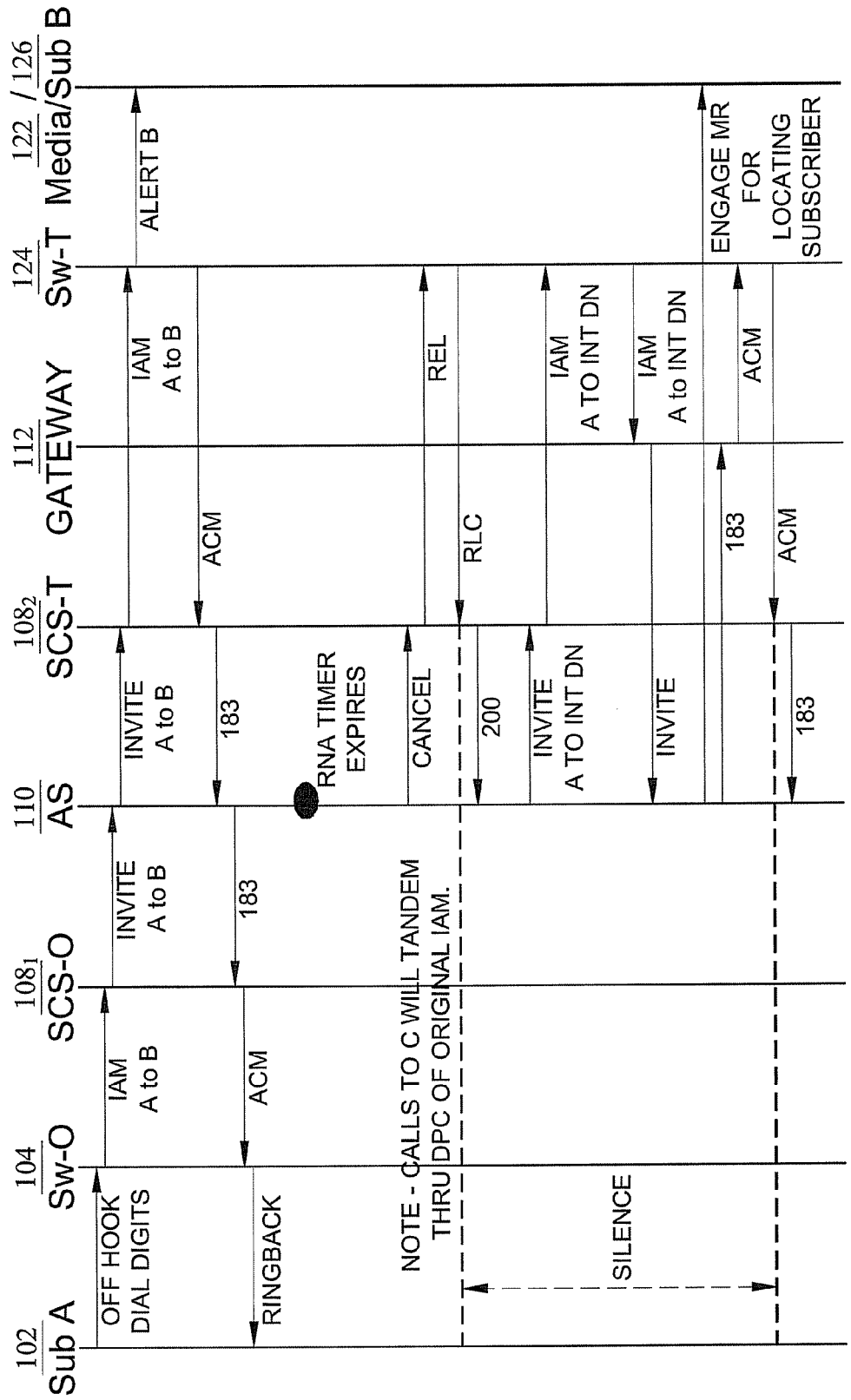
FIGS. 12 and 13 depict a call flow diagram of the application of a find me/follow me function when the called party fails to answer according to an embodiment of the subject matter described herein.
Figure 13:
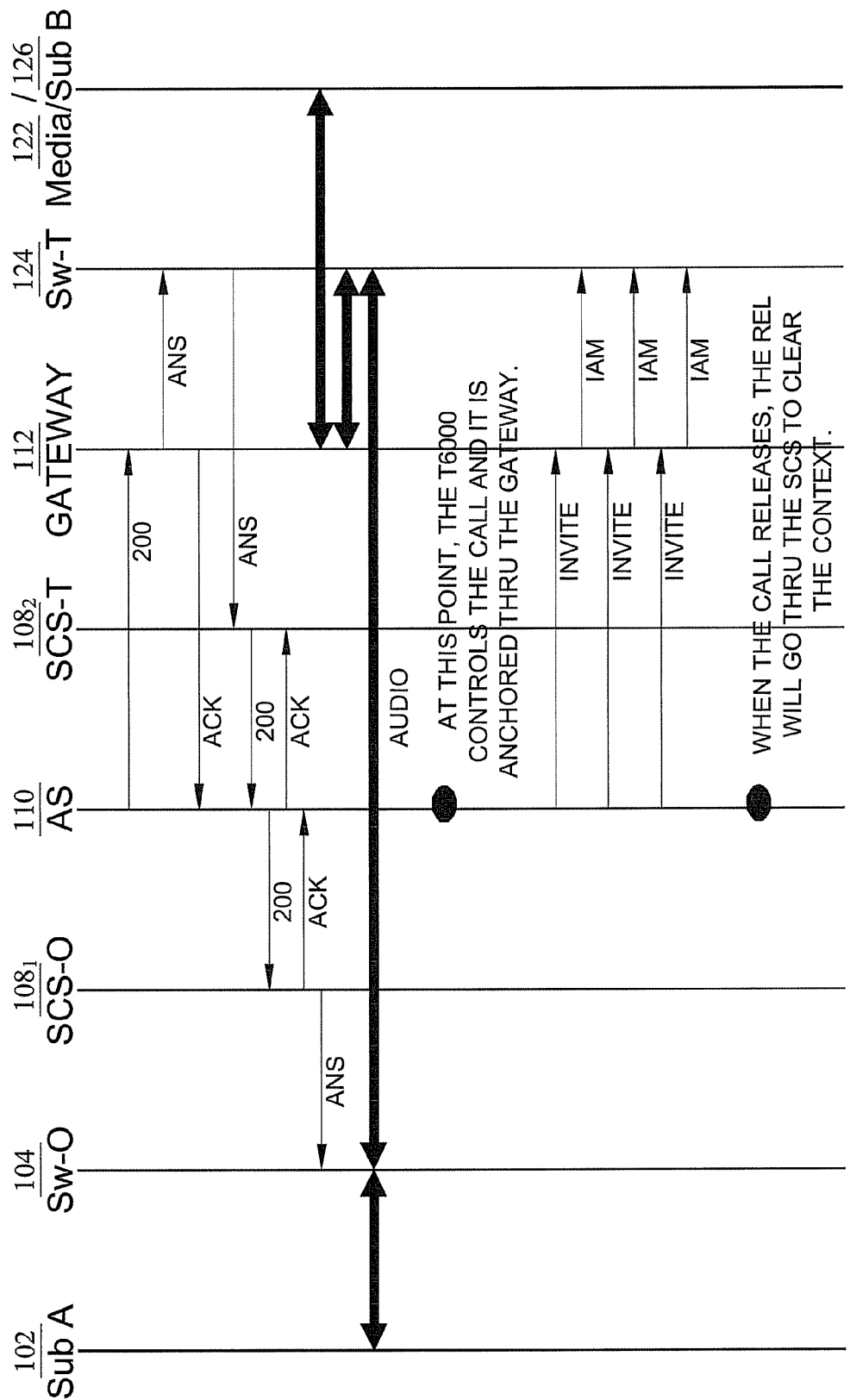

FIGS. 12 and 13 illustrate an exemplary call flow diagram pertaining to the present subject matter. Specifically, FIGS. 12 and 13 depict a call setup that involves a find me/follow me service where there is no initial answer. Referring to FIG. 12, subscriber A 102 picks up the phone, initiates an off hook signal, and dials the phone number digits of subscriber B 126. The dial digits are received by SSP 104 which then sends an ISUP IAM that includes the called party number (e.g., subscriber B's phone number) and the calling party number (e.g., subscriber A's phone number) to SCS node 108 (i.e., SCS 108₁). From SCS 108₁, an INVITE message is sent to application server 110. Although not shown in this call flow diagram, application server 110 logs the call and applies NGN-based end user services (which are associated to the service subscription associated with subscriber A and/or subscriber B) to the call. Application server 110 responds by sending a SIP INVITE message to SCS node 108 (i.e., SCS 108₂).

Upon receiving INVITE message, SCS 108₂ sends an IAM. In this scenario, the terminating switching office 124 receives the IAM and transmits an alert to subscriber B 126. At this time, subscriber B 126 does not answer, and a "ring no answer" (RNA) timer expires at application server 110. Consequently, application server 110 sends a CANCEL message to SCS 108₂, which in turn sends a release message to SSP 124 to terminate the call leg. SSP 124 responds with an RLC message (i.e., the called side portion of the call is torn down) directed to SCS 108₂, which then generates a 200 OK message that is directed to application server 110. Application server 110 issues an INVITE message that is addressed to an internal directory number. In one embodiment, the internal directory number may be associated to media resource 122.

The INVITE message is received by SCS 108₂, which then generates an IAM that is received by SSP 124. SSP 124 responds by forwarding the IAM to gateway 112, which then generates an INVITE message directed to application server 110. In one embodiment, the INVITE message traverses through the original internal switch because of the need to tandem the call in PSTN. Application server 110 then engages media resource 122 in order to locate the subscriber. In one embodiment, media resource 122 needs to be engaged (e.g., establish a temporary call) because the find me/follow me service may take more than the predetermined amount of time before the call is automatically terminated. Application server 110 also sends a 183 message back to gateway 112, which in turn sends an ACM message to SSP 124.

Referring to FIG. 13, AS 110, gateway 112, terminating switch 124, and originating switch 104 signal each other to set up the bearer paths indicated by the bold arrows. Once a bearer path is established, application server 110 generates a plurality of INVITE messages to ring all the communication devices registered by subscriber B. Similarly, upon receiving the INVITE messages, gateway 120 generates a respective plurality of IAMs that are sent to SSP 124. The IAMs ring different numbers associated with the called subscriber, thus providing a find me or follow me service.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for providing next generation network (NGN)-based end user services to legacy subscribers in a communications network, the method comprising:
   at a service creation system (SCS) node having at least one processor, using the at least one processor for:
      receiving a signaling system 7 (SS7) call setup signaling message associated with a call involving a legacy subscriber access device and holding the SS7 call setup signaling message; while holding the SS7 call setup signaling message:
      generating a session initiation protocol (SIP) call setup signaling message related to the SS7 call setup signaling message;
      initiating the providing of at least one NGN-end user service for the call using the SIP call setup signaling message, wherein initiating the providing of at least one NGN-end user service includes sending the SIP call setup signaling message from the SCS node to an application server that applies the at least one NGN-end user service to the call involving the legacy subscriber access device;
      determining whether to modify the SS7 call setup signaling message based on the at least one NGN-based end user service, and, in response to determining to modify the SS7 call setup signaling message, modifying the SS7 call setup signaling message; and
      routing the SS7 call setup signaling message towards a destination;
   wherein the SIP call setup signaling message comprises a first SIP INVITE message, wherein using the SIP call setup signaling message to initiate the providing of the at least one NGN-based end user service includes sending the first SIP INVITE message to the application server that provides the at least one NGN-based end user service and receiving a second SIP INVITE message from the application server, and wherein determining whether to modify the SS7 call setup signaling message includes correlating the first SIP INVITE message with the second SIP INVITE message and comparing the first and second SIP INVITE messages to identify the presence of information regarding the at least one NGN-based end user service.

2. The method of claim 1 wherein receiving a SS7 call setup signaling message includes receiving at least one of an ISDN user part (ISUP) initial address message (IAM) and an Internet Engineering task force (IETF) SIGTRAN signaling message from a public switched telephone network (PSTN) switching office.

3. The method of claim 1 wherein the SCS node stores a database of subscriber identifiers and specifications for corresponding NGN-based end user services to be applied to calls involving the subscriber identifiers.

4. The method of claim 1 wherein the at least one NGN-based end user service comprises at least one of a call logging service, a call forwarding service, an add media or short code dialing service, a find me service, a blacklist or whitelist service, a call blocking service, a voice-to-text transcription service, and a follow me service.

5. The method of claim 1 wherein modifying the SS7 call setup signaling message is performed without requiring an end office trigger.

6. The method of claim 1 comprising, in response to determining that at least one NGN-based end user service is not to be applied to the call, performing at least one of hairpinning the call back to a PSTN switching office from which the signaling message originated, generating an ISUP RELEASE message, and discarding the SS7 call setup signaling message.

7. A system for providing next generation network (NGN)-based end user services to legacy subscribers in a communications network, the system comprising:
   a service creation system (SCS) node having a message buffer for receiving a signaling system 7 (SS7) call setup signaling message associated with a call involving a legacy subscriber access device and for holding the SS7 call setup signaling message;
   the SCS node including a service capability interaction manager (SCIM) for, while the message buffer is holding the SS7 call setup signaling message:
   generating a session initiation protocol (SIP) call setup signaling message related to the SS7 call setup signaling message;
   initiating the providing of at least one NGN-end user service for the call using the SIP call setup signaling message, wherein initiating the providing of at least one NGN-end user service includes sending the SIP call setup signaling message from the SCS node to an application server that applies the at least one NGN-end user service to the call involving the legacy subscriber access device;
   determining whether to modify the SS7 call setup signaling message based on the at least one NGN-based end user service, and, in response to determining to modify the SS7 call setup signaling message, modifying the SS7 call setup signaling message; and
   routing the SS7 call setup signaling message towards a destination;
   wherein the SIP call setup signaling message comprises a first SIP INVITE message, wherein the SCIM is configured for sending the first SIP INVITE message to the application server that provides the at least one NGN-based end user service and receiving a second SIP INVITE message from the application server, and wherein the SCIM is further configured for correlating the first SIP INVITE message with the second SIP INVITE message and comparing the first and second SIP INVITE messages to identify the presence of information regarding the at least one NGN-based end user service.

8. The system of claim 7 wherein the call setup signaling message comprises at least one of an ISDN user part (ISUP) initial address message (IAM) and an Internet Engineering task force (IETF) SIGTRAN signaling message from a public switched telephone network (PSTN) switching office.

9. The system of claim 7 wherein the SCS node includes a database of subscriber identifiers and specifications for corresponding NGN-based end user services to be applied to calls involving the subscriber identifiers.

10. The system of claim 7 wherein the NGN-based end user service comprises one of: a call logging service, a call forwarding service, an add media or short code dial service, a find me service, a blacklist or whitelist service, a call blocking service, a voice-to-text transcription service, and a follow me service.

11. The system of claim 7 wherein the SCIM is configured for modifying the SS7 call setup signaling message without requiring an end office trigger.

12. The system of claim 7 wherein the SCIM is further configured for, in response to determining that at least one NGN-based end user service is not to be applied to the call, performing at least one of hairpinning the call back to a PSTN switching office from which the signaling message originated, generating an ISUP RELEASE message, and discarding the SS7 call setup signaling message.

13. A non-transitory computer readable medium having stored thereon computer executable instructions that when executed by a processor of a computer control the computer to perform steps comprising:
   at a service creation system (SCS) node having at least one processor, using the at least one processor for:
   receiving a signaling system 7 (SS7) call setup signaling message associated with a call involving a legacy subscriber access device and holding the SS7 call setup signaling message;
   while holding the SS7 call setup signaling message:
   generating a session initiation protocol (SIP) call setup signaling message related to the SS7 call setup signaling message;
   initiating the providing of at least one NGN-end user service for the call using the SIP call setup signaling message, wherein initiating the providing of at least one NGN-end user service includes sending the SIP call setup signaling message from the SCS node to an application server that applies the at least one NGN-end user service to the call involving the legacy subscriber access device;
   determining whether to modify the SS7 call setup signaling message based on the at least one NGN-based end user service, and, in response to determining to modify the SS7 call setup signaling message, modifying the SS7 call setup signaling message; and
   routing the SS7 call setup signaling message towards a destination;
   wherein the SIP call setup signaling message comprises a first SIP INVITE message, wherein using the SIP call setup signaling message to initiate the providing of the at least one NGN-based end user service includes sending the first SIP INVITE message to the application server that provides the at least one NGN-based end user service and receiving a second SIP INVITE message from the application server, and wherein determining whether to modify the SS7 call setup signaling message includes correlating the first SIP INVITE message with the second SIP INVITE message and comparing the first and second SIP INVITE messages to identify the presence of information regarding the at least one NGN-based end user service.

14. The computer readable medium of claim 13 wherein receiving an SS7 call setup signaling message includes receiving at least one of an ISDN user part (ISUP) initial address message (IAM) and an Internet Engineering task force (IETF) SIGTRAN signaling message from a public switched telephone network (PSTN) switching office.

15. The computer readable medium of claim 13 wherein the SCS node includes a database of subscriber identifiers and specifications for corresponding NGN-based end user services to be applied to calls involving the subscriber identifiers.

16. The computer readable medium of claim 13 wherein the at least one NGN-based end user service comprises at least one of a call logging service, a call forwarding service, an add media or short code dialing service, a find me service, a blacklist or whitelist service, a call blocking service, a voice-to-text transcription service, and a follow me service.

17. The computer readable medium of claim 13 wherein modifying the SS7 call setup signaling message is performed without requiring an end office trigger.

18. The computer readable medium of claim 13 comprising, in response to determining that at least one NGN-based end user service is not to be applied to the call, performing at least one of hairpinning the call back to a PSTN switching office from which the signaling message originated, generating an ISUP RELEASE message, and discarding the SS7 call setup signaling message.

* * * * *